United States Patent
Ganser et al.

(10) Patent No.: US 8,922,885 B2
(45) Date of Patent: Dec. 30, 2014

(54) FLUORESCENCE MICROSCOPE HAVING AN ILLUMINATION DEVICE

(75) Inventors: Michael Ganser, Giessen (DE); Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1003 days.

(21) Appl. No.: 12/032,435

(22) Filed: Feb. 15, 2008

(65) Prior Publication Data
US 2008/0198448 A1 Aug. 21, 2008

(30) Foreign Application Priority Data

Feb. 16, 2007 (DE) .......................... 10 2007 007 797

(51) Int. Cl.
*G02B 21/06* (2006.01)
*G02B 21/16* (2006.01)
*G02B 27/10* (2006.01)

(52) U.S. Cl.
CPC .............. *G02B 21/16* (2013.01); *G02B 21/06* (2013.01); *G02B 27/1006* (2013.01)
USPC ......................................................... 359/385

(58) Field of Classification Search
CPC ..... G02B 21/16; G02B 21/06; G02B 21/0076
USPC .......................................... 359/385, 389, 388
See application file for complete search history.

(56) References Cited

U.S. PATENT DOCUMENTS

| | | | |
|---|---|---|---|
| 6,193,401 B1 * | 2/2001 | Girkin et al. | 362/551 |
| 6,747,280 B1 | 6/2004 | Weiss | |
| 7,289,265 B2 * | 10/2007 | Koyama | 359/385 |
| 2003/0107800 A1 * | 6/2003 | Doering et al. | 359/388 |
| 2005/0047172 A1 * | 3/2005 | Sander | 362/554 |
| 2005/0224692 A1 | 10/2005 | Tsuchiya et al. | |
| 2005/0248839 A1 | 11/2005 | Yamaguchi | |
| 2006/0187542 A1 | 8/2006 | Westphal et al. | |

FOREIGN PATENT DOCUMENTS

| | | | |
|---|---|---|---|
| DE | 19624087 | 12/1997 | |
| DE | 198 58 206 C2 | 10/2001 | |
| DE | 202004010121 | 8/2004 | |
| DE | 10314125 | 10/2004 | |
| EP | 15 93 996 A2 | 11/2005 | |
| JP | 07333516 | 12/1995 | |
| JP | 2005321453 | 11/2005 | |
| WO | WO 9513527 A1 * | 5/1995 | G01N 21/25 |

OTHER PUBLICATIONS

Machine Translation of WO 9513527 (May 1995).*
WO 1995/13527 Human Translation published May 18, 1995.*

* cited by examiner

*Primary Examiner* — Zachary Wilkes
(74) *Attorney, Agent, or Firm* — Leydig, Voit & Mayer, Ltd.

(57) ABSTRACT

An arrangement for fluorescence microscopic examination of specimens includes: a fluorescence microscope; an illumination device that includes: a housing including an interface configured to optically couple the housing and the fluorescence microscope; a plurality of light-emitting diodes disposed in the housing; a respective collector disposed downstream of each of the light emitting diodes and configured to generate a directed light flux; and at least one dichroic splitter disposed in the housing, the at least one splitter and the light-emitting diodes being spatially disposed with respect to one another so that the directed light fluxes are combinable via the at least one splitter into a common illumination beam path directed onto the interface; and a logical control device common to the fluorescence microscope and the illumination device.

27 Claims, 3 Drawing Sheets

FLUORESCENCE MICROSCOPE HAVING AN ILLUMINATION DEVICE

CROSS REFERENCE TO RELATED APPLICATIONS

Priority is claimed to German patent application DE 10 2007 007 797.3, filed Feb. 16, 2007, and which is hereby incorporated by reference herein.

FIELD

The invention relates to an arrangement for fluorescence microscopic examination of specimens, comprising a fluorescence microscope, an illumination device with an illumination beam path and a plurality light-emitting diodes for illumination of a specimen.

BACKGROUND

Fluorescence microscopy plays a major role as a diagnostic tool in many natural-science disciplines. The fundamental principle of fluorescence microscopy is to irradiate a sample with short-wave excitation radiation whereupon the sample itself, or a fluorescing dye with which the sample is stained, emits longer-wave fluorescent light (primary or secondary fluorescence) upon excitation with the short-wave excitation radiation. For fluorescence microscopy, secondary fluorescence is generally used to visualize certain specimen structures of stained preparations. Using fluorescence microscopy it is possible, for example, to identify pathogens, localize genes or determine genetic changes in DNA that is being examined, or visualize protein formation in cells.

A particular examination method using specific fluorescing dyes (so-called fluorochromes) is available depending on the application. Excitation using UV light for the "DAPI" dye, blue light for the "FITC" dye, or green light for the "Texas Red" or "rhodamine" dyes is, for example typical. Typical excitation frequencies are in the ultraviolet and visible spectral region.

Short-arc lamps filled with mercury or xenon, or halogen lamps, are normally used as light sources in the illumination systems for fluorescence microscopes. The light sources are most frequently located in a separate lamp housing that is adapted to the microscope. The aforementioned light sources possess a substantially continuous spectrum (UV to IR) that is interspersed with characteristic lines of high intensity. The spectral region appropriate for excitation of a fluorochrome can be selected from the spectral region of the light source by means of various (exchangeable) dielectric filters, called excitation filters. The bandwidth of the excitation filters is typically approximately 10 to 30 nm.

It is typical to work with different fluorescence filter systems (so-called filter blocks or filter cubes) so that different stains in a preparation can be visualized. These fluorescence filter systems comprise a mutually coordinated combination of an excitation filter, a dichroic splitter, and a blocking filter. The dichroic splitter reflects the excitation radiation to the preparation, but is transparent to the fluorescent light emitted from the preparation. The blocking filter shields the preparation from scattered excitation light that enters the objective. It possesses very high transparency, however, for the specific fluorescent radiation. The various fluorescence filters are usually located on a changing device that is embodied, for example, as a slider or carousel. Operation occurs manually and/or in motorized fashion.

Disadvantages of the aforesaid lamps of hitherto usual fluorescent illumination systems are low efficiency (since of the approximately 100 W of electrical power, only a few milliwatts reach the sample in the selected spectral region) and the troublesome heat evolution resulting therefrom. Lastly, the service life of the lamps is limited to a few hundred hours.

Very recently, light-emitting diodes or LEDs have been proposed and offered on the market as light sources for fluorescence microscopes.

DE 20 2004 010 121 U1, for example, describes a light source for an incident-light fluorescence microscope that comprises a high-power LED that emits blue light (460 to 480 nm). An arrangement having a single LED does not, however, meet the usual requirements of a routine or research laboratory.

An arrangement for fluorescent illumination is described in the Japanese application having the publication number JP 2005-321453; here the light of a light-emitting diode is conveyed via a collector lens into a fluorescence filter system and from there onto a specimen. The fluorescent light emitted from the specimen is directed via a blocking filter onto a CCD detector and/or an eyepiece. Also, this arrangement with a single LED cannot meet the requirements imposed here. The corresponding EP 1 593 996 A2 describes an expansion of this system to two light-emitting diodes, whose light fluxes are combined via a dichroic splitter and conveyed to a fluorescence filter system.

A fluorescence microscope in which lasers are used as light sources is described in the Japanese application having the publication number JP 07-333516. Here the light of two lasers is directed via dichroic splitters into a common illumination beam path. The fluorescent light emitted from the specimen is likewise conveyed through the same dichroic splitter to corresponding photodetectors. With this device, the specimen can be illuminated simultaneously with two excitation wavelengths, and the two resulting fluorescence wavelengths can be detected separately. A sequential excitation with different wavelengths is not possible when the lasers are operated continuously.

DE 103 14 125 B4 describes an LED light source arrangement for specimen illumination for fluorescence-microscopy applications, in which arrangement multiple diodes are arranged on a turntable; by rotation of the turntable about an axis at the center of the turntable, a specific diode can be selected and positioned in front of a light exit opening. Located at the light exit opening is a collimator optical system that couples the emitted light of the diode into the illumination beam path of the fluorescence microscope. Each light-emitting diode is joined to the turntable via a Peltier element to dissipate heat, and a retainer.

A disadvantage of this known LED light source arrangement is that changing to a different wavelength is associated with a mechanical movement of the turntable carrying the diodes. A change of wavelengths therefore takes a relatively long time and is associated with vibration and noise because of the mechanical movement. Because the diodes require good cooling, Peltier elements and/or correspondingly large masses are necessary in the receiving apparatus. In addition, electrical leads to the LEDs and to the Peltier elements on the turntable are problematic (wiper contacts or limited rotation range).

Lastly, the company COOLLED offers a light source in which multiple diodes are coupled in parallel in a liquid light guide. The three colors can be adjusted independently as to their intensity. Disadvantages of this illumination system are principally its size and weight. The liquid light guide furthermore generates light losses and light fluctuations, and requires an additional adapter to permit connection to usual lamp interfaces of the microscopes.

From DE 196 24 087 A1 furthermore an illumination apparatus for generating light having a high beam power level and large bandwidth is described. For this purpose, multiple single-point light sources, such as light-emitting diodes, that each emit light in a preferred direction, are spatially arranged with respect to one another by means of a holding device in such a way that the single-point light sources emit their light in at least two different directions; an optical device in the form of a reflector is provided, which device modifies the characteristics of the light emitted from the single-point light sources in such a way that it directs the radiated light in a predetermined direction. If the light sources have different wavelengths, a homogeneous color mixture of the light having different wavelengths can be achieved by corresponding configuration of the reflector as a diffuser. The conformation of the illumination apparatus proposed therein can resemble that of a usual halogen radiator. In an embodiment, the light emitted from multiple light-emitting diodes strikes a reflector, by which it is directed homogeneously onto the exit opening of the reflector and additionally color-mixed and collimated, so that the viewer can no longer detect the fact that the light derives originally from individual light-emitting diodes. The specific problems and requirements of an illumination device for fluorescence-microscopy examinations are not discussed in this document.

The long service life (several thousand hours) of LEDs, their rapid operability with no need for warm-up time, and the stable radiation power output, sufficient for fluorescence excitation, in a specific wavelength region having full widths at half maximum of approximately 20 to 50 nm, are advantages that make LED-based illumination systems for fluorescence microscopes superior to conventional systems.

SUMMARY

An aspect of the present invention provides a physically compact arrangement, easily operated by the user, for fluorescence-microscopic examination of specimens and includes a fluorescence microscope and an illumination device.

In an embodiment the present invention provides an arrangement for fluorescence microscopic examination of specimens. The arrangement includes: a fluorescence microscope; an illumination device that includes: a housing including an interface configured to optically couple the housing and the fluorescence microscope; a plurality of light-emitting diodes arranged in the housing; a respective collector disposed downstream of each light emitting diode and configured to generate a directed light flux; and at least one dichroic splitter disposed in the housing, the at least one splitter and the light-emitting diodes spatially being disposed with respect to one another so that the directed light fluxes are combinable via the at least one splitter into a common illumination beam path directed onto the interface; and a logical control device common to the fluorescence microscope and the illumination device.

BRIEF DESCRIPTION OF THE DRAWINGS

Aspects of the present invention will now be described by way of exemplary embodiments with reference to the following drawing, in which.

DETAILED DESCRIPTION

Figure 1:
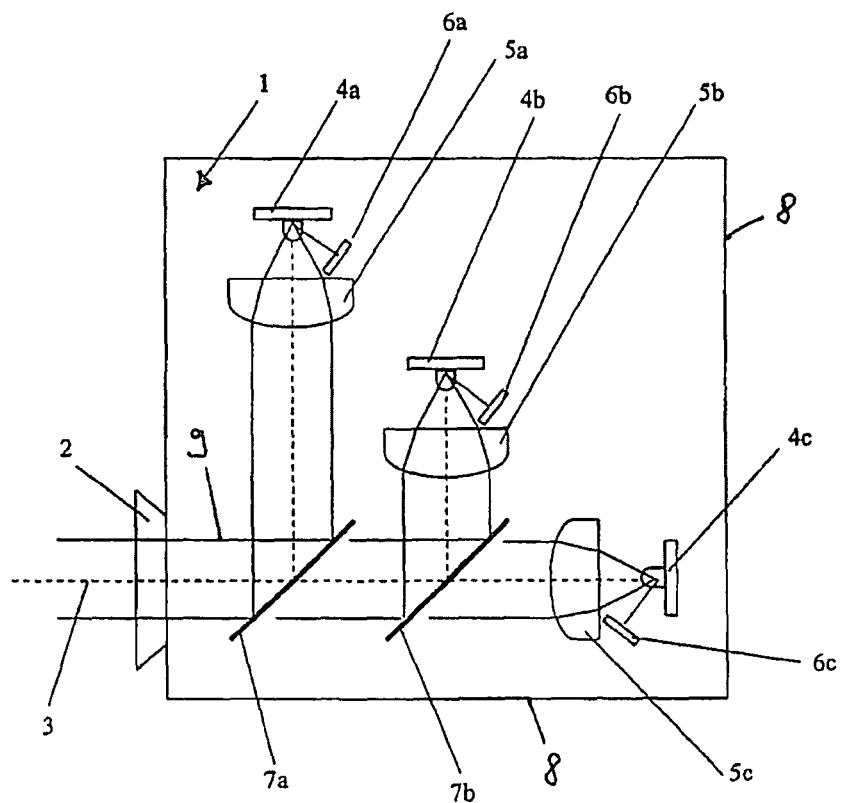
FIG. 1 schematically shows an illumination device in a side view.

Aspects of the present invention is relate to light-emitting diodes (LEDs) as light sources. Other functionally identical, substantially single-point light sources can, however, of course also be used for the illumination device according to an embodiment of the present invention, in particular other single-point semiconductor light sources such as, for example, semiconductor lasers or further semiconductor arrangements that exhibit luminescence effects, for example amorphous silicon. The term "light-emitting diode" is therefore to be regarded as a synonym for light sources of this kind.

The arrangement according to exemplary embodiments of the present invention include a fluorescence microscope and an illumination device including a housing with an interface for optically coupling the housing onto the microscope; including a plurality of light-emitting diodes arranged in the housing, each light-emitting diode with a collector respectively arranged downstream each light-emitting diode for generating a directed light flux; and including at least one dichroic splitter arranged in the housing, the splitter or splitters and the light-emitting diodes being spatially arranged with respect to one another in a way that the light fluxes of the light-emitting diodes are combinable, via the splitter or splitters, into one common illumination beam path that in turn is directed onto the interface in the housing. The fluorescence microscope and the illumination device possess a common logical control device.

According to an exemplary embodiment of the present invention, an illumination device can be limited to the aforesaid components, namely light-emitting diodes, collectors, and dichroic splitters. An extremely compact design is therefore possible. The housing can be configured like a lamp housing for a short-arc lamp, said housing enabling direct optical coupling onto the microscope. The light flows (light fluxes) of the diodes are combined via dichroic parts components, each diode having its own collector so that the light flux can be adapted to the characteristics of the particular diode.

An advantage of the present invention is that it provides a separate illumination device of compact size that is easily adaptable to a fluorescence microscope. The two units—the fluorescence microscope and illumination device—are controlled together, in a manner coordinated with one another, by a logical control device. In the case of a changing device having different fluorescence filter system, for example, only the associated light-emitting diode is switched on depending on which filter block is swung in. Functions of a microscope for which an independent hardware unit (optical system) was previously necessary, can, however, also be entirely taken over by logical activation of the illumination device. Examples therefore are the shutter or an attenuating optical system, which was previously present in the fluorescence microscope in order to interrupt a light flux or reduce the intensity of the light flux. According to the invention, the light-emitting diodes can now be switched off by the common control device so that a shutter can be replaced, or a current reduction can be performed so that an attenuating optical system can be omitted. The common logical control device also allows any filter wheel to be omitted. With the use of such a filter wheel in conjunction with a multi-band fluorescence filter, for example, fluorochromes can be sequentially excited by varying the position of the filter wheel. Activation of individual light-emitting diodes via the common control device makes it possible, according to the invention, to excite the fluorochromes sequentially with no need for an internal filter wheel. As a further example, adaptation to excitation intensities can be performed in conjunction with a multi-band fluorescence filter system. A hardware solution disclosed in DE 198 58 206 C2 exists for this. The invention can easily replace this (manual or motorized) so-called "excitation manager" by adjusting the light fluxes of the light-emitting diodes via the common logical control device.

In an embodiment of the invention, functions of the illumination device are mapped onto operating elements on the fluorescence microscope. This allows functions of the fluorescence microscope, such as the shutter, attenuator, filter wheel, and excitation manager, to be controlled in the accustomed fashion on the microscope stand, in which context the common logical control device logically converts the microscope functions into corresponding functions of the illumination device, such as switching the light-emitting diodes on/off, reducing the light fluxes of the light-emitting diodes by reducing current, sequentially activating light-emitting diodes, or adjusting the light-emitting diode light flows in order to adapt excitation intensities.

Some advantageous embodiments of the illumination device within the arrangement according to the present invention for fluorescence-microscopy examination will be explained below.

It is advantageous if the main axes of the directed light fluxes of the light-emitting diodes lie in a common plane. When two light-emitting diodes are used, these main axes usefully are perpendicular to one another, a dichroic splitter being arranged (in particular at a 45° angle to the respective main axes) at the intersection point. When three light-emitting diodes are used, usefully two main axes are directed parallel to one another and respectively perpendicular to the third main axis. Two dichroic splitters are then usefully arranged (once again usefully at 45°) along the third main axis, at the intersection points of the first and third and the second and third main axes respectively. Be it noted in this connection that the term "dichroic splitter" is also intended to encompass polychroic or multi-band beam splitters.

It is useful if the collectors are embodied as collimator lenses, so that the light flux of each light-emitting diode is not only collected but also directed in parallel fashion. Because the dichroic layers on the splitters are highly angle-dependent, the incidence of parallel light bundles is advantageous. It is additionally advantageous in this connection if the collector lenses are arranged focusably, i.e. displaceably along the main emission axis of a light-emitting diode. This allows the focus to be aligned more accurately. For maximum light intensity yield, it is additionally advantageous if the light-emitting diodes are arranged alignably, so that all the light from the small active chip area (on the order of 1 mm$^2$ in size) is incident into the collector/collimator.

It is expedient if the light-emitting diodes generate light fluxes of different emission spectra, the emission spectra exhibit good conformity or correspondence with the absorption spectra of the particular fluorochromes being used. It can also be expedient, however, to replace at least one of the light-emitting diodes with a white-light source or to use a light-emitting diode having an as white as whitest possible emission spectrum, so that wavelength regions that cannot be directly covered by colored diodes can be served by means of a filter placed in front. In principle, halogen or mercury light sources can also additionally be provided in the same fashion.

Depending on the excitation wavelengths desired for the fluorescence microscopic examination, it can be useful to insert into the illumination beam path a corresponding multi-band (multiple bandpass) filter so that residual light outside the defined excitation wavelength can reliably be avoided. It is additionally advantageous if the light-emitting diodes, arranged spatially in substantially fixed fashion, are thermally coupled via a common baseplate. This allows temperature fluctuations to be equalized, so that the temperature remains relatively stable especially when the light-emitting diodes are operated in alternating fashion. Temperature-related fluctuations in light intensity can thereby be avoided. It may furthermore be expedient to provide a device for cooling the light-emitting diodes. This device can encompass, for example, a fan or one or more Peltier elements.

In this connection, be it noted once again that the illumination device according to an embodiment of the present invention permits both continuous operation of the light-emitting diodes and alternating operation of the light-emitting diodes.

It is advantageous if the common logical control device is designed to control or regulate the electrical power delivered to a light-emitting diode. Controlling the power level in this manner allows the light output or light intensity of a light-emitting diode to be controlled so that, as already mentioned, an "excitation manager" or attenuator provided separately in the beam path can be dispensed with.

By regulating the light intensity of a light-emitting diode it is furthermore possible to reliably avoid fluctuations in light intensity, for example because of temperature fluctuations. For this purpose, the relevant light-emitting diode usefully is operatively connected to a detector for regulating the light intensity. It is advantageous in this context if the detector encompasses a sensor for receiving at least part of the light flux of a light-emitting diode and for generating an output signal dependent on the light intensity received, and encompasses the aforesaid control device, downstream from the sensor, for regulating, as a function of said sensor output signal, the electrical power level delivered to the light-emitting diode. Regulation systems of this kind are known per se, and will therefore not be discussed in further detail here. Scattered light or residual light passing through the beam splitter, but also light specifically coupled out by means of a beam splitter, can be used as part of the light flux emerging from the light-emitting diode and delivered to the sensor.

The arrangement according to an embodiment of the present invention for fluorescence microscopic examination of specimens includes a fluorescence microscope and an illumination device such as the one discussed above. Fluorescence microscopes include an objective and a tube lens or tube optical system for imaging the specimen. The image that is generated is then viewed or received by a viewer, a CCD camera, and/or another detector. Incident-light fluorescence microscopes, in which the illumination beam path can be guided through the microscope's objective, are often involved. A fluorescence filter system (filter block), already described in the introduction to the description, is usually present in the illumination beam path and the imaging beam path.

Be it noted that the use of light-emitting diodes allows the aforementioned fluorescence filter system to be modified: Especially when narrow-band light-emitting diodes are used, the need for an excitation filter can in some circumstances be eliminated. In such a case the filter block would be made up only of a (dichroic) splitter and a blocking filter. It would furthermore also be conceivable to be able to dispense with a blocking filter, especially when the excitation wavelength (or excitation spectrum) is far enough away from the fluorescence wavelength (or fluorescence spectrum). With sufficiently high contrast, the blocking filter can then be omitted. Be it noted, however, that blocking filters also have a protective function, especially for excitation frequencies in the UV region.

Depending on the excitation wavelength required and the fluorochrome being used, the corresponding suitable fluorescence filter system is usually introduced into the illumination and imaging beam paths. Changing devices are, as a rule, present for this purpose. As already mentioned, it is advantageous if, as a function of the fluorescence filter block swung into the beam path, the associated light-emitting diode is activated via the common logical control device (the same applies vice versa). In order to entirely avoid any mechanical movement in the context of a switchover between different fluorescence excitations, however, it is useful to use a multi-band fluorescence filter system that takes over the function of several individual fluorescence filter systems and that comprises a multi-band excitation filter, a multi-band splitter, and a multi-band blocking filter. As already set forth above, in some circumstances the multi-band blocking filter and/or multi-band excitation filter can be omitted. When these multi-band elements are used, a switchover between different fluorescence excitations can take place exclusively electrically, by the fact that the light-emitting diodes are operated alternatingly. This makes possible an even faster and vibration-free switchover of the excitation wavelength.

With the arrangement recited, it is advantageous if the fluorescence microscope and the illumination device possess a common power supply, in which context, in particular, the illumination system can be operated from the power supply of the microscope stand.

The optomechanical functions of the illumination axis provided in a fluorescence microscope, such as the shutter, attenuator, and wavelength switchover system (using a filter wheel) can, in the context of the arrangement proposed here, be logically remapped or reinterpreted as functions of the light-emitting diode control system. The shutter, for example, corresponds to shutting off the light-emitting diodes, the attenuator to a diminution of the electric power level delivered, and the wavelength switchover system to alternating operation of the light-emitting diodes. The optomechanical functions hitherto present can consequently be implemented in purely electrical fashion with the proposed system. This is the basis for an essential advantage of the arrangement according to the present invention for fluorescence-microscopy examination of specimens. For this purpose, the arrangement according to the present invention is preferably set up in such a way that actuation of an operating element on the fluorescence microscope triggers a corresponding signal to the control device, which in turn authorizes a corresponding function of the illumination device. Among the operating elements are: shutter, attenuator, filter wheel, and/or the excitation manager already mentioned. In this fashion, these microscope functions can be operated in familiar fashion from the stand, except that now only the illumination device, rather than the components that hitherto had to be provided in the fluorescence microscope, must be correspondingly actuated.

The illumination system can be both powered and logically controlled from a system interface of an automated stand (e.g. i$^2$C, CAN bus). In this case the illumination system is adaptable in particularly simple fashion to the fluorescence microscope.

It is understood that the features of the invention that have been and are yet to be discussed are usable not only in the particular combination indicated but also in other combinations, or in isolation, without leaving the scope of the present invention.

The illumination device according to FIG. 1 contains three light-emitting diodes, as is often the case in practice. These are, for example, light-emitting diodes 4a, 4b, 4c having emission spectra in the UV region and in the blue and green spectral region. The nature of the light-emitting diodes used, and their emission spectrum, depends on the excitation wavelength of the fluorochrome used (in the case of specimens that do not independently fluoresce). Instead of one of the light-emitting diodes 4a, 4b, 4c depicted it is also possible, as mentioned, to use a white-light LED or another white light source having a filter in front, in particular if the wavelength thereby generated cannot be made available by a light-emitting diode. Placed in front of each light-emitting diode 4a, 4b, 4c is a respective collimator lens 5a, 5b, 5c at whose focal point the respective light-emitting diode 4a, 4b, 4c, is located, thus forming a directed light flux made up of parallel light beams.

Light-emitting diodes 4a, 4b, 4c and collimator lenses 5a, 5b, 5c are arranged together in a housing 8 that can represent a lamp housing. Housing 8 includes a so-called dovetail or interface 2 for adapting the illumination device to a fluorescence microscope. Optical axis 3, or the common illumination axis of the illumination device and fluorescence microscope, extends through this interface 2.

Two dichroic splitters 7a, 7b are additionally accommodated in housing 8 of illumination device 1. Light-emitting diodes 4a, 4b, 4c, with their collimator lenses 5a, 5b, 5c, are arranged physically with respect to dichroic splitters 7a, 7b in such a way that the light fluxes of the light-emitting diodes can be combined via splitters 7a, 7b into one common illumination beam path 9. This illumination beam path 9 is directed onto interface 2 of illumination device 1. In the easily implemented and compact arrangement according to FIG. 1, other than the aforesaid elements no further optical or mechanical devices (mirrors, beam splitters, lenses, or the like) are present in the individual beam paths. This contributes to the simple and economical configuration.

In this exemplifying embodiment, the main emission axes (principal directions) of the light fluxes that are generated by the individual light-emitting diodes with their collimator lenses, and the common illumination beam path, are arranged in one plane. The main emission axes of light-emitting diodes 4a and 4b proceed parallel to one another, and the main emission axis of light-emitting diode 4c proceeds perpendicular to those of the two aforesaid light-emitting diodes 4a and 4b. Dichroic splitters 7a and 7b are arranged at the respective intersection points of these main emission axes. While the beam paths of light-emitting diodes 4a and 4b are deflected 90°, the beam path of light-emitting diode 4c is maintained upon passage through dichroic splitters 7a and 7b. Dichroic splitter 7b thus deflects the light flux of light-emitting diode 4b through 90°, while it possesses maximum transparency for the light flux of light-emitting diode 4c. Dichroic splitter 7a deflects the light flux of light-emitting diode 4a through 90°, while it possesses maximum transparency for the resulting light fluxes of light-emitting diodes 4b and 4c. All three light fluxes are combined into the common illumination beam path 9 that leaves illumination device 1 through interface 2.

The advantageous embodiments already discussed above, such as focusable collimator lenses, alignable light-emitting diodes, or the arrangement of the light-emitting diodes on a common thermally conductive baseplate, are explicitly referred to again here. Also depicted in FIG. 1 are sensors 6a, 6b, 6c that are respectively associated with the individual light-emitting diodes 4a, 4b, 4c and that serve to capture a portion of the light emitted from a light-emitting diode. As also already explained, sensors 6a, 6b, 6c that are depicted can also be arranged at other useful locations. For example, sensor 6a can also be mounted downstream of splitter 7a along the extension of the main emission axis of light-emitting diode 4a, where it can use for detection the residual light passing through beam splitter 7a. The same applies to sensor 6b. It is helpful if the detector absorbs, if possible, no light that is usable for specimen illumination. The use of sensors 6a to 6c to control and regulate the light intensity is discussed with reference to FIG. 2.

As already mentioned, the light-emitting diodes in illumination device 1 that is depicted can be used in continuous mode or alternatingly. This depends, in particular, on the type of fluorescence filter system possessed by the fluorescence microscope that is to be adapted.

Figure 2:
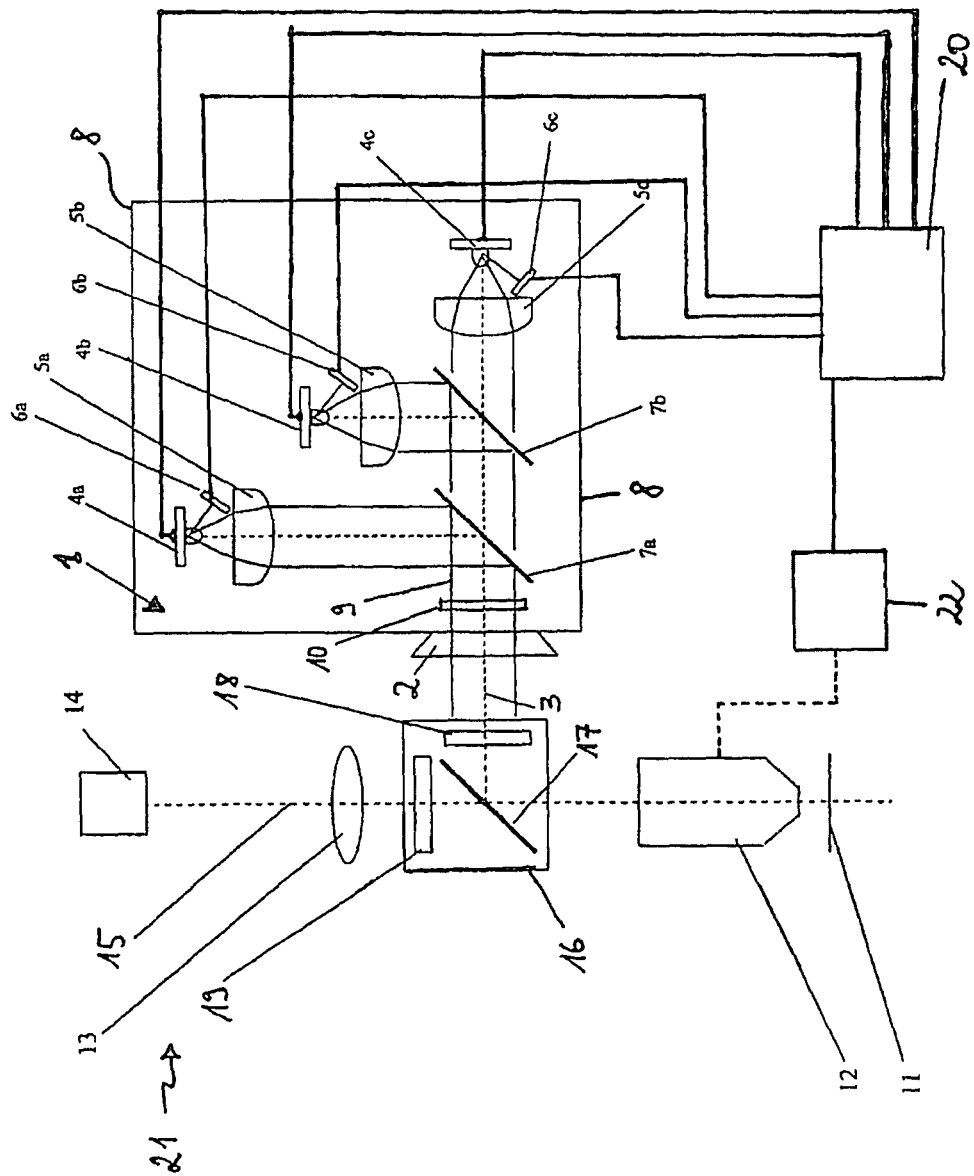
FIG. 2 schematically shows a first arrangement according to an exemplary embodiment of the present invention having a fluorescence microscope and an illumination device, in a side view.

FIG. 2 shows a first embodiment of an arrangement according to the present invention for fluorescence-microscopy examination of a specimen 11, comprising illumination device 1 depicted in FIG. 1 and a fluorescence microscope 21. Optical coupling is performed via interface (or dovetail) 2 of illumination device 1.

The constituents of fluorescence microscope 21 include: objective 12, fluorescence filter system 16, and tube lens or tube optical system 13. Objective 12 and tube lens 13 serve to image the specimen or the specimen region being examined, the viewing medium (detector/CCD array, or eye and eyepiece) being labeled 14.

In the exemplifying embodiment depicted according to FIG. 2, what is used is not a filter changing device having multiple fluorescence filter systems that are introduced into illumination beam path 9 depending on the excitation frequency (cf. FIG. 3), but instead a single multi-band fluorescence filter system 16 that, from the three light fluxes arriving from light-emitting diodes 4a, 4b, and 4c, passes on narrow-band excitation spectra to multi-band beam splitter 17, from which the illumination beam path is deflected and directed through objective 12 onto specimen 11. Multi-band excitation filter 18 and/or multi-band filter 10 here ensure that the excitation wavelengths have a sufficiently narrow band.

Depending on the excitation spectrum, the illuminated specimen region or the fluorochrome present thereon emits a specific fluorescence spectrum. Objective 12 generates a corresponding intermediate image that is imaged by tube optical system 13 onto viewing medium 14. Multi-band beam splitter 17 is, for this purpose, transparent to all three fluorescence spectra that are generated, depending on the excitation, by the three different excitation spectra. The same applies to multi-band blocking filter 19 that, for its part, is as opaque as possible to the three excitation spectra in order to filter out scattered light of the excitation spectra so that it does not strike viewing medium 14.

With the arrangement depicted in FIG. 2, and with all three light-emitting diodes 4a, 4b, and 4c operated continuously, simultaneous excitation is performed in the three different excitation spectra or excitation wavelengths. What is possible in particular, however, is simple sequential or alternating excitation, and thus a rapid change in excitation wavelengths. For this, the corresponding light-emitting diodes 4a, 4b, and 4c are operated sequentially or alternatingly. Light-emitting diodes 4a, 4b, and 4c are activated in this context via a control device 20. As depicted in FIG. 2, control device 20 is connected to light-emitting diodes 4a, 4b, and 4c in order to, on the one hand control the electrical power level delivered to each light-emitting diode, with the result that the radiated light intensity can be raised or lowered or the light-emitting diodes can be selectively switched on and off. This enables alternating excitation with a specific excitation wavelength at a predetermined light intensity.

With an alternating operation of the light-emitting diodes, temperature fluctuations occur that can lead to fluctuations in the light intensity. To prevent this, it is helpful to couple light-emitting diodes 4a to 4c thermally via a common baseplate; if necessary, active cooling mechanisms (fan, Peltier element) can additionally be used. In addition (or alternatively), fluctuations in the light intensity can be eliminated by regulation thereof. Provided for this purpose are sensors 6a, 6b, and 6c already discussed in connection with FIG. 1, which are operationally connected to control device 20. Sensors 6a, 6b, 6c capture a defined portion of the light radiated by light-emitting diodes 4a, 4b, 4c and generate an output signal dependent on the captured light intensity, which signal is delivered to control device 20. If the correlation between the light intensity desired for illumination beam path 9 and the output signal generated by the respective sensor is known, control device 20 can consequently regulate the light intensity to a desired setpoint by activating to the respective light-emitting diode and regulating the electrical power level delivered to the light-emitting diode.

The arrangement depicted in FIG. 2 for fluorescence-microscopy examination of specimens 11 thus permits a very rapid alternating or sequential examination using different wavelengths, with no need to move optomechanical components such as a filter wheel. The change in excitation wavelengths takes place purely electronically. Shutters, attenuators, and filter changing devices that hitherto needed to be provided in such systems can be dispensed with, since the corresponding functions (switching on and off, lowering the light intensity, switching over excitation wavelengths) can be implemented in purely electronic fashion using control device 20.

As already mentioned, the excitation intensities can also be adapted electronically by way of the common logical control device 20, by adjusting the light fluxes of light-emitting diodes 4a, 4b, 4c.

In an embodiment of the arrangement depicted in FIG. 2, fluorescence microscope 21 comprises a control unit 22 that is connected to the common logical control device 20. This control unit 22 can, if necessary, also be connected to fluorescence microscope 21 (indicated by the dashed line to objective 12) in order to perform hardware control operations on the microscope itself (such as objective changing). On control or operating unit 22, functions of fluorescence microscope 21 such as the shutter, attenuator, filter wheel, or excitation manager can be controlled in familiar fashion; common logical control device 20 logically converts these microscope functions into corresponding functions of illumination device 1 without the presence of the corresponding components in the fluorescence microscope. For example, when the shutter is selected on control unit 22, light-emitting diodes 4a, 4b, 4c would be switched off by being activated by control device 20. Regarding further functions of the fluorescence microscope, the reader is referred to the statements already made. In this fashion, various microscope functions can be implemented very quickly with no mechanical movement of corresponding microscope components.

Figure 3:
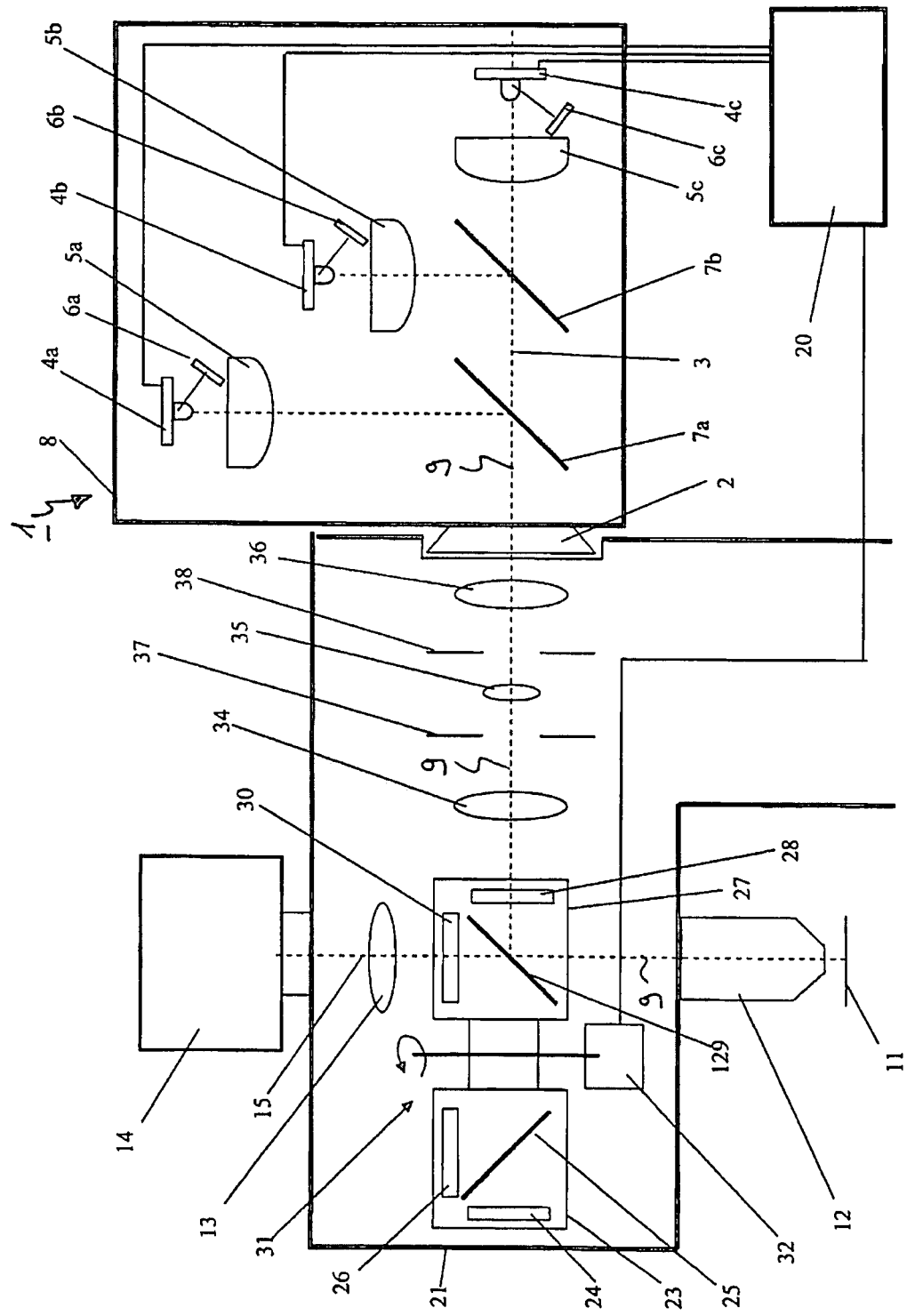
FIG. 3 schematically shows a second arrangement according to an exemplary embodiment of the present invention having a fluorescence microscope and an illumination device, once again in a side view.

FIG. 3 shows a second embodiment of an arrangement according to the present invention for fluorescence-microscopy examination of specimens. In contrast to the embodiment according to FIG. 2, here a filter changing device 31 is used that is introduced into illumination beam path as a function of the desired excitation frequency. In this case it is possible for all three light-emitting diodes 4a, 4b, and 4c to be operated in continuous mode, the desired excitation frequency being selected by introduction of the corresponding fluorescence filter system into illumination beam path 9; or for light-emitting diodes 4a, 4b, and 4c to be operated alternatingly in order to generate the desired excitation frequency, which is then directed via the corresponding fluorescence filter system onto specimen 11. The latter operating mode is more energy-saving, but can entail the disadvantage of temperature fluctuations, which in turn can cause light-emitting diodes 4a, 4b, and 4c to have broader-band emission spectra. As in FIG. 2, here as well a multi-band filter 10 can be provided in illumination device 1 to ensure that the excitation frequencies have sufficiently narrow bands.

With the exception of the fluorescence filter system, all the statements made in connection with the embodiment according to FIG. 2 also apply in connection with FIG. 3. To avoid repetition, only those aspects differing from the embodiment according to FIG. 2 will be emphasized below.

Arranged along illumination beam path 9 is firstly a lens 36 followed by an aperture diaphragm 38, a further lens 35 followed by a field diaphragm 37, and lastly a further lens 34. Instead of the lenses depicted, these can of course be lens systems or optical systems in general. When field diaphragm 37 is correctly adjusted, the specimen portion presently being examined is illuminated, so that the preparation is protected from excessive light radiation and contrast-diminishing scattered radiation is reduced.

Fluorescence microscope 21 further contains a fluorescence filter changing device 31 that is operated by a motor 32. In the embodiment depicted, changing device 31 is a carousel; a slider would also be possible in principle. Located on the carousel of changing device 31 are multiple fluorescence filter systems of which two are depicted here, namely fluorescence filter system 23 and fluorescence filter system 27. As a rule, as many fluorescence filter systems as there are light-emitting diodes are present, if the latter possess a specific emission wavelength. In the case of white-light diodes, multiple fluorescence filter systems, which filter the corresponding excitation wavelengths out of the white emission spectrum, can be provided for each diode. Fluorescence filter systems 23, 27 are substantially identical in configuration, and each contain an excitation filter 24, 28, a dichroic splitter 25, 29, and a blocking filter 26, 30.

As depicted in FIG. 3, fluorescence filter system 27 is swung into illumination beam path 9. Excitation filter 28 thus filters the corresponding excitation wavelength out of illumination beam path 9 that strikes it, a deflection toward specimen 11 then being performed via dichroic splitter 29. Dichroic splitter 29 is transparent to the fluorescence spectrum coming from specimen 11 or the fluorescence wavelength to be detected, so that this light can strike blocking filter 30. Blocking filter 30 is also transparent to the fluorescence wavelength to be detected, but reliably filters out scattered residual light of the excitation frequency. The remaining details of the manner in which fluorescent microscope 21 operates are known from the statements above, in particular in connection with FIG. 2.

With regard to the manner of operation and possible embodiments of illumination device 1 according to FIG. 3, the reader may once again be referred to the statements above, in particular in connection with FIG. 2.

Fluorescence microscope 21 and illumination device 1 are controlled together, in a manner coordinated with one another, by logical control device 20. Depending on the fluorescence filter system 23, 27 that is swung in, in this manner only the associated light-emitting diode 4a, 4b, or 4c can be switched on. Control device 20 receives for this purpose a corresponding signal from motor 32, whose position allows an inference as to the fluorescence filter system that is engaged. The associated light-emitting diode is correspondingly switched on by control device 20, and the corresponding illumination intensity is adjusted. The light intensity regulation already referred to can once again be performed. The other two light-emitting diodes are preferably switched off.

Once again, control unit 22 (cf. FIG. 2) of fluorescence microscope 21 (not depicted in FIG. 3) can be connected to control device 20 so that certain microscope functions can be mapped, in the manner already referred to, onto functions of illumination device 1.

PARTS LIST

Illumination device
Interface, dovetail
Optical axis
4a, b, c Light-emitting diodes
5a, b, c Collector lenses
6a, b, c Sensors
7a, b Dichroic splitters
Housing
Illumination beam path
Multi-band filter
Specimen
Objective
Tube optical system
Viewing medium
Imaging beam path
Multi-band fluorescence filter system
Multi-band beam splitter
Multi-band excitation filter
Multi-band blocking filter
Control device
Fluorescence microscope
Control unit, operating unit
Fluorescence filter system
Excitation filter
Dichroic splitter
Blocking filter
Fluorescence filter system
Excitation filter
Dichroic splitter
Blocking filter
Changing device
Motor
Lens
Lens
Lens
Field diaphragm
Aperture diaphragm

What is claimed is:

1. An arrangement for fluorescence microscopic examination of specimens, comprising:
   a fluorescence microscope including a control unit having operating elements corresponding to microscope functions including an operating element corresponding to a shutter function;
   an illumination device that includes:
      a housing including an interface configured to optically couple the housing and the fluorescence microscope;
      a plurality of light-emitting diodes disposed in the housing;

a respective collector disposed downstream of each of the light emitting diodes and configured to generate a directed light flux; and at least one dichroic splitter disposed in the housing, the at least one dichroic splitter and the light-emitting diodes being spatially disposed with respect to one another so that the directed light fluxes are combinable via the at least one dichroic splitter into a common illumination beam path directed onto the interface; and a logical control device common to the fluorescence microscope and the illumination device, wherein functions of the illumination device are mapped onto the operating elements of the control unit of the microscope such that actuation of the operating elements on the fluorescence microscope causes the logical control device to logically convert signals triggered by the actuation of the operating elements into corresponding functions of the illumination device implemented in a purely electrical fashion and such that the actuation of the operating element corresponding to the shutter function causes the shutter function to be implemented by the illumination device without using a shutter.

2. The arrangement recited in claim 1, wherein the collector includes a collimator lens.

3. The arrangement recited in claim 1, wherein the light-emitting diodes are configured to generate light fluxes having different emission spectra.

4. The arrangement recited in claim 1, wherein at least one of the light-emitting diodes is configured to generate a white emission spectrum.

5. The arrangement recited in claim 1, further comprising a multi-band filter insertable into the illumination beam path inside the housing.

6. The arrangement recited in claim 1, wherein the light-emitting diodes are thermally coupled via a baseplate.

7. The arrangement recited in claim 1, wherein the logical control device is configured to control or regulate electrical power delivered to at least one of the light-emitting diodes.

8. The arrangement as recited in claim 7, wherein at least one of the light-emitting diodes is operatively connected to a detector so as to regulate the light intensity.

9. The arrangement recited in claim 8, wherein the detector includes a sensor configured to receive at least part of a light flux of the at least one of the light-emitting diodes, the sensor being configured to generate an output signal dependent on an intensity of light received, and wherein the logical control device is connected downstream from the sensor and configured to regulate, as a function of the output signal, electrical power delivered to the light-emitting diode.

10. The arrangement recited in claim 1, wherein at least one of the light-emitting diodes is operatively connected to a detector so as to regulate the light intensity.

11. The arrangement recited in claim 10, wherein the detector includes a sensor configured to receive at least part of a light flux of the at least one of the light-emitting diodes, the sensor being configured to generate an output signal dependent on an intensity of light received, and wherein the logical control device is connected downstream from the sensor and configured to regulate, as a function of the output signal, electrical power delivered to the light-emitting diode.

12. The arrangement recited in claim 1, further comprising a cooling device configured to cool the light-emitting diodes.

13. The arrangement recited in claim 1, wherein main axes of the directed light fluxes of the light-emitting diodes lie in a common plane.

14. The arrangement recited in claim 1, further comprising a multi-band beam splitter configured to deflect the illumination beam path onto a specimen.

15. The arrangement recited in claim 14, further comprising a multi-band excitation filter arranged upstream of the multi-band beam splitter.

16. The arrangement recited in claim 15, wherein at least one of the multi-band beam splitter and the multi-band excitation filter are components of a multi-band fluorescence filter system.

17. The arrangement recited in claim 1, further comprising a dichroic beam splitter configured to deflect the illumination beam path onto the specimen.

18. The arrangement recited in claim 17, further comprising an excitation filter arranged upstream of the dichroic beam splitter.

19. The arrangement recited in claim 18, wherein at least one of the dichroic beam splitter and the excitation filter are components of a fluorescence filter system.

20. The arrangement recited in claim 19, further comprising a changing device and a second fluorescent filter system, the fluorescent filter system and the second fluorescent filter system being integrated into the changing device.

21. The arrangement recited in claim 20, wherein the logical control device is configured to activate the changing device based on an activated light-emitting diode of the light-emitting diodes so that an associated fluorescence filter system of the fluorescent filter system and the second fluorescent filter system is introduced into the illumination beam path.

22. The arrangement recited in claim 1, further comprising a power supply common to the fluorescence microscope and the illumination device.

23. The arrangement recited in claim 1, wherein the logical control device is configured so that actuation of a control element of the fluorescence microscope triggers a corresponding signal to the control device so that the control device authorizes a corresponding function of the illumination device.

24. The arrangement recited in claim 1, wherein the operating elements operate at least one of a shutter, an attenuator, a filter wheel, and an excitation manager.

25. The arrangement as recited in claim 1, wherein at least one of the light-emitting diodes is operatively connected to a detector so as to regulate the light intensity.

26. The arrangement recited in claim 25, wherein the detector includes a sensor configured to receive at least part of a light flux of the at least one of the light-emitting diodes, the sensor being configured to generate an output signal dependent on an intensity of light received, and wherein the logical control device is connected downstream from the sensor and configured to regulate, as a function of the output signal, electrical power delivered to the light-emitting diode.

27. The arrangement recited in claim 1, wherein no shutter is present in the arrangement.

* * * * *